United States Patent
Kondo et al.

(10) Patent No.: US 8,322,798 B2
(45) Date of Patent: Dec. 4, 2012

(54) PARKING BRAKE CONTROL UNIT

(75) Inventors: Kazuma Kondo, Chita-gun (JP);
Takashi Watanabe, Nagoya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 607 days.

(21) Appl. No.: 12/560,595

(22) Filed: Sep. 16, 2009

(65) Prior Publication Data
US 2010/0072811 A1 Mar. 25, 2010

(30) Foreign Application Priority Data
Sep. 24, 2008 (JP) .................................. 2008-243963

(51) Int. Cl.
*B60T 13/00* (2006.01)
(52) U.S. Cl. .............................. 303/20; 701/70; 188/265
(58) Field of Classification Search .............. 303/3, 124, 303/125, 138, 20; 701/70, 71; 188/265
See application file for complete search history.

(56) References Cited

U.S. PATENT DOCUMENTS

| | | | |
|---|---|---|---|
| 7,344,205 B2* | 3/2008 | Kamiya et al. | 303/124 |
| 7,358,864 B2* | 4/2008 | Mori et al. | 303/125 |
| 7,813,859 B2* | 10/2010 | Aizawa et al. | 701/70 |
| 8,103,421 B2* | 1/2012 | Kondo et al. | 701/70 |
| 2006/0267402 A1 | 11/2006 | Leiter et al. | |
| 2009/0206650 A1* | 8/2009 | Ninoyu et al. | 303/3 |

FOREIGN PATENT DOCUMENTS
JP 2007-519568 A 7/2007

* cited by examiner

*Primary Examiner* — Melanie Torres Williams
(74) *Attorney, Agent, or Firm* — Buchanan Ingersoll & Rooney PC (57) ABSTRACT

When a brake force is generated by a service brake in accordance with the depression of a brake pedal by a driver, a brake force generated by an electric parking brake is reduced when lock control is performed, taking the brake force generated by the service brake into consideration. More specifically, a target motor current value increase amount is corrected such that as the brake force generated by the service brake becomes larger, the target motor current value increase amount becomes smaller. Thus, when brake force is generated by the electric parking brake and the service brake compensates for the brake force, it is possible to inhibit generation of a brake force larger than necessary.

8 Claims, 8 Drawing Sheets

PARKING BRAKE CONTROL UNIT

CROSS REFERENCE TO RELATED APPLICATION

This application is based upon and claims the benefit of Japanese Patent Application No. 2008-243963 filed on Sep. 24, 2008, the content of which are incorporated herein by reference.

BACKGROUND OF THE INVENTION

1. Field of the Invention

The present invention relates to a parking brake control unit that performs lock control of an electric parking brake (EPB).

2. Description of the Related Art

Generally, parking brakes are used to restrict the movement of parked vehicles. Various parking brakes are known, such as, for example, manual parking brakes that transmit an operation force to a brake mechanism by pulling a brake cable using a control lever, and electric parking brakes that transmit motor torque to a brake mechanism by pulling a cable using the torque of the motor.

When an electric parking brake (EPB) is locked, a motor is rotated to a locked side (positive rotation) so as to transmit the motor torque to a brake mechanism (an actuator), and the motor drive is stopped in a state where a brake force is generated. When the EPB is released, the motor is rotated to a released side (negative rotation) so as to release the brake force.

Among the EPBs in which lock/release control like that described above is performed, an EPB is disclosed that uses an automatic pressurizing function of a service brake in order to reduce motor output when the parking brake is applied. More specifically, when a vehicle is stopping on a flat road with a relatively small load and a large brake force does not need to be generated, only a motor for the parking brake is actuated. When the vehicle is stopping on a sloped road with a relatively large load and a large brake force needs to be generated, the service brake compensates for insufficient brake force of the parking brake. Thus, brake force that is sufficient to prevent the vehicle from sliding down is secured (refer to JP-T-2007-519568, for example).

However, when the service brake compensates for the insufficient brake force of the parking brake as described in JP-T-2007-519568, the magnitude of the service brake application, namely, the brake force generated by a driver depressing a brake pedal is not taken into consideration. Therefore, when the driver depresses the brake pedal with a large depression force, there is a possibility that the brake force generated when the parking brake is applied will be larger than necessary. In this case, the durability of a brake caliper and a parking brake actuator needs to be set such that, even when a large brake force is generated, the brake caliper and the parking brake actuator can endure it. As a result, tough requirements need to be satisfied, and the size and weight of the brake caliper and the parking brake actuator are increased.

SUMMARY OF THE INVENTION

In light of the foregoing, the present invention provides a parking brake control unit that is capable of, when brake force is generated by a parking brake and a service brake compensates for the brake force, inhibiting generation of a brake force larger than necessary.

To address the above-described problems, according to a first aspect of the present invention, a parking brake control unit includes a lock control unit that performs lock control such that, after a pressing force is generated by driving an electric motor and a brake force of an electric parking brake is generated by the pressing force, the lock control unit stops the drive of the electric motor on condition that the pressing force reaches a target pressing force at which the drive of the electric motor is stopped, and locks the electric parking brake while maintaining the brake force. The lock control unit includes a correction unit that corrects the target pressing force such that as the brake force generated by a service brake becomes larger, the target pressing force becomes smaller.

In this manner, the correction unit corrects the target pressing force such that as the brake force generated by the service brake becomes larger, the target pressing force becomes smaller. With this correction, when brake force is generated by the electric parking brake and the service brake compensates for the brake force, it is possible to inhibit generation of a brake force larger than necessary.

According to a second aspect of the present invention, when the pressing force varies after the pressing force has been generated by the electric parking brake when the friction member comes into contact with the friction receiving member, the correction unit does not change the corrected target pressing force.

In this manner, if the target pressing force is not changed after the correction, it is possible to inhibit the lock control from becoming unstable due to changes in the target pressing force after the correction.

For example, according to a third aspect of the present invention, as a physical quantity corresponding to the brake force generated by the service brake, at least one of a master cylinder pressure, a wheel cylinder pressure, a load applied to a member that moves the friction member, and an amount of movement of the member that moves the friction member may be used.

Further, according to a fourth aspect of the present invention, as a physical quantity corresponding to the pressing force, a motor current that flows through the electric motor may be detected. In this case, in the lock control unit, the motor current generated before the friction member comes into contact with the friction receiving member may be set as a no load current, and a value obtained by adding a target motor current value increase amount to the no load current may be set as the target pressing force. Further, the drive of the electric motor may be stopped when an increase amount of the motor current from the no load current exceeds the target motor current value increase amount. The correction unit may correct the target pressing force by correcting the target motor current value increase amount such that as the brake force generated by the service brake becomes larger, the target motor current value increase amount becomes smaller.

In this case, according to a fifth aspect of the present invention, the correction unit may obtain a subtraction value that becomes larger as the brake force generated by the service brake becomes larger, and may calculate the corrected target motor current value increase amount by subtracting the subtraction value from the target motor current value increase amount.

For example, with the parking brake control unit as described above, according to a sixth aspect of the present invention, a piston is provided in a brake caliper, and the service brake and the electric parking brake may have a mechanism that presses the friction member using the piston provided in the brake caliper.

DETAILED DESCRIPTION OF THE PREFERRED EMBODIMENTS

Hereinafter, embodiments of the present invention will be described with reference to the appended drawings. Note that, structural members that are the same or similar to each other in the respective embodiments below are denoted with the same reference numerals in the drawings.

First Embodiment

Figure 1:
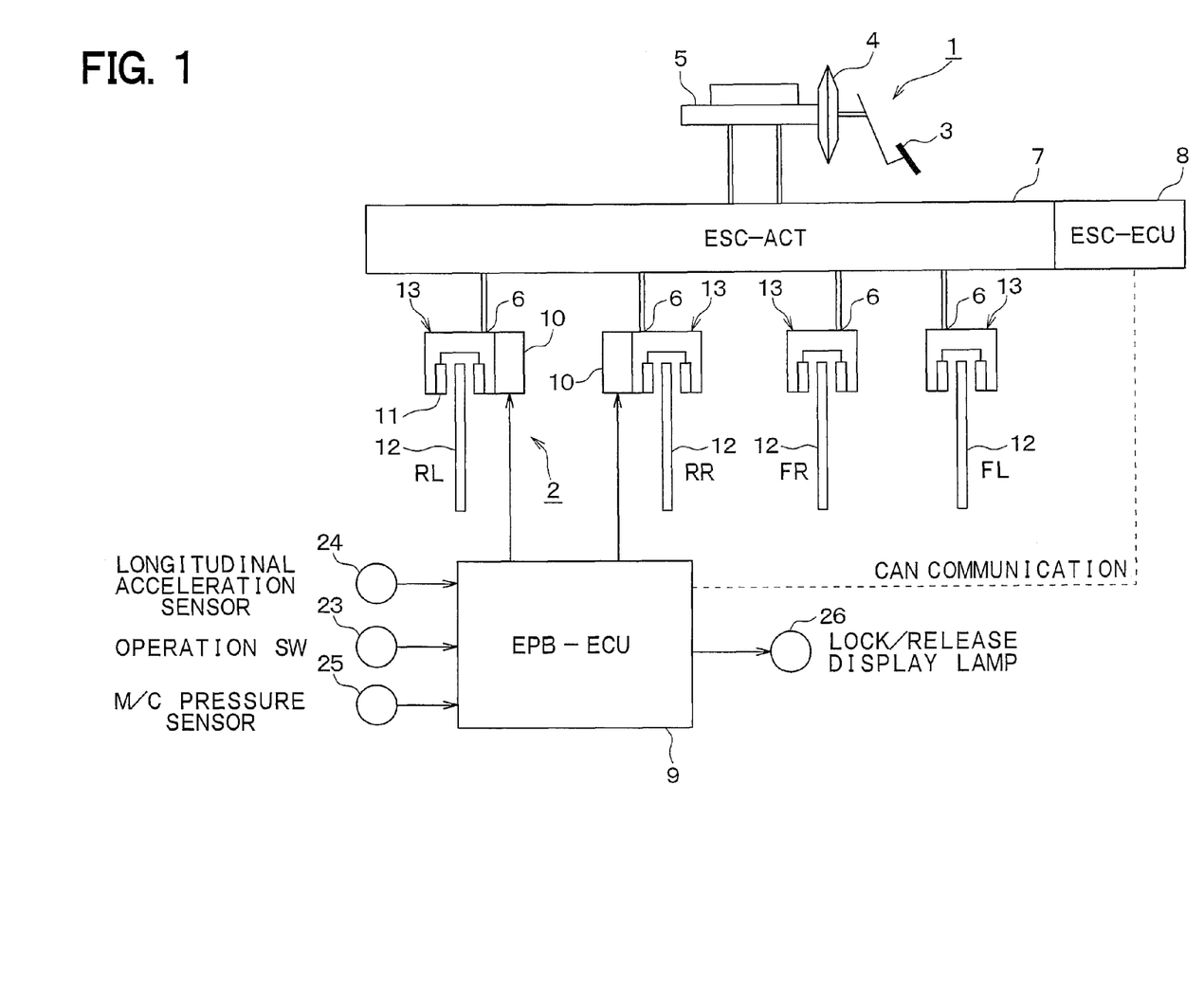
FIG. 1 is a schematic diagram showing an overview of a vehicle brake system, to which a parking brake control unit according to a first embodiment of the present invention is applied.
Figure 2:
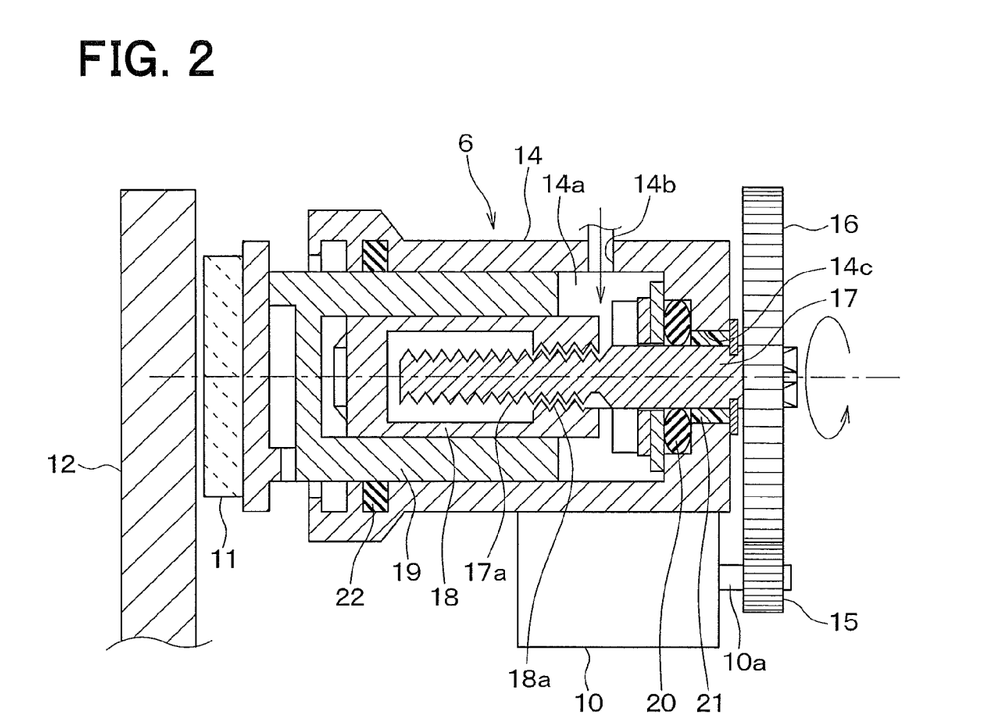
FIG. 2 is a sectional schematic diagram showing a rear wheel brake mechanism provided in the brake system shown in FIG. 1.

A first embodiment of the present invention will be described. In the present embodiment, a vehicle brake system in which an electric parking brake (EPB) using a disk brake is applied to a rear wheel system will be described as an example. FIG. 1 is a schematic diagram showing an overview of a vehicle brake system, to which a parking brake control unit according to the present embodiment is applied. FIG. 2 is a sectional schematic diagram showing a rear wheel brake mechanism provided in the brake system. The present embodiment will now be described with reference to FIG. 1 and FIG. 2.

As shown in FIG. 1, the brake system is provided with a service brake 1 that generates a brake force based on a pedal depression force of a driver, and an EPB 2 that restricts movement of the vehicle when it is parked.

The service brake 1 boosts the pedal depression force in accordance with the depression of a brake pedal 3 by the driver using a brake booster 4, and generates brake hydraulic pressure in accordance with the boosted pedal depression force in a master cylinder (hereinafter referred to as an M/C) 5. Then, the service brake 1 transmits the brake hydraulic pressure to a wheel cylinder (hereinafter referred to as a W/C) 6 provided in a brake mechanism of each wheel, thereby generating a brake force. Further, an actuator 7 for brake hydraulic pressure control is provided between the M/C 5 and the W/C 6. Thus, the brake force generated by the service brake 1 can be adjusted, and various types of control (for example, anti-skid control etc.) can be performed to improve the safety of the vehicle.

The various types of control that use the actuator 7 are executed by an electronic stability control (ESC)-ECU 8. For example, the ESC-ECU 8 outputs a control current for controlling various types of control valves and a pump drive motor (not shown in the figures) that are provided in the actuator 7. The ESC-ECU 8 thereby controls a hydraulic circuit provided in the actuator 7, and controls the W/C pressure transmitted to the W/C 6. As a result, wheel slip is avoided, and the safety of the vehicle is improved. For example, the actuator 7 includes, for each wheel, an increase control valve, a pressure decrease control valve, and a differential pressure control valve etc., and the W/C pressure can be controlled to be increased, maintained or reduced. The increase control valve controls either the application of the brake hydraulic pressure that is generated in the M/C 5 for the W/C 6 or the application of the brake hydraulic pressure generated by the pump drive. The pressure decrease control valve reduces the W/C pressure by supplying the brake fluid in each W/C 6 to a reservoir. The differential pressure control valve is arranged in a main conduit that connects the M/C 5 and each W/C 6, at a position that is on the M/C 5 side with respect to a supplementary conduit to which a pump discharge pressure is introduced. The structure of the actuator 7 is known, and detailed explanation is therefore omitted here.

On the other hand, the EPB 2 generates a brake force by controlling the brake mechanism using motors 10. The EPB 2 includes an EPB control unit (hereinafter referred to as an EPB-ECU) 9 that controls the drive of the motors 10.

The brake mechanism is a mechanical structure that generates a brake force in the brake system according to the present embodiment. A front wheel brake mechanism is a structure that generates a brake force by operating the service brake 1. Meanwhile, the rear wheel brake mechanism is a dual-operation structure that generates a brake force in response to both the operation of the service brake 1 and the operation of the EPB 2. The front wheel brake mechanism is a generally used known brake mechanism, and does not include the mechanism that generates a brake force based on the operation of the EPB 2, unlike the rear wheel brake mechanism. Therefore, a description of the front wheel brake mechanism is omitted here, and the rear wheel brake mechanism will be described below.

Not only when the service brake 1 is actuated, but also when the EPB 2 is actuated, the rear wheel brake mechanism presses a pair of facing brake pads 11, which serve as a friction member. (FIG. 2 shows just one of the facing brake pads 11. The following explanation will generally focus on this one brake pad 11, although a similar explanation applies to the other brake pad 11 in the pair.) The brake pads 11 sandwich a brake disc 12, which serves as a friction receiving member. Thus, a friction force is generated between the brake pads 11 and the brake disc 12, thereby generating a brake force.

More specifically, in a caliper 13 of each rear wheel shown in FIG. 1, the brake mechanism rotates the motor 10 that is directly fixed to a body 14 of the W/C 6 for pressing the brake pads 11 as shown in FIG. 2, and thereby rotates a small gear 15 provided on a drive shaft 10a of the motor 10. Then, the brake mechanism transmits the torque of the motor 10 to a large gear 16 that is meshed with the small gear 15, and thereby moves the brake pads 11. Thus, the brake force of the EPB 2 is generated.

In the caliper 13, in addition to the W/C 6 and the brake pads 11, a part of an end face of the brake disc 12 is housed such that it is sandwiched between the facing brake pads 11. The W/C 6 is structured such that when brake hydraulic pressure is supplied to a hollow section 14a of the cylinder shaped body 14 through a passage 14*b*, W/C pressure is generated. The W/C 6 includes, in the hollow section 14*a*, a rotation shaft 17, a propeller shaft 18, a piston 19 and so on.

An end of the rotation shaft 17 is connected to the large gear 16 through an insertion hole 14*c* formed in the body 14. When the large gear 16 is rotated, the rotation shaft 17 is rotated along with the rotation of the large gear 16. A male screw groove 17*a* is formed in an outer surface of the rotation shaft 17 at an end of the rotation shaft 17 that is on the opposite side to the end connected to the large gear 16. The other end of the rotation shaft 17 (i.e., the end connected to the large gear 16) is inserted to the insertion hole 14*c*, and is thereby supported axially. More specifically, the insertion hole 14*c* is provided with an O-ring 20 and a bearing 21. The O-ring 20 prevents the brake fluid from leaking through between the rotation shaft 17 and an inner wall surface of the insertion hole 14*c*, and the bearing 21 axially supports the other end of the rotation shaft 17.

The propeller shaft 18 is a hollow tubular member, and a female screw groove 18*a* engaged with the male screw groove 17*a* is formed in an inner wall surface of the propeller shaft 18. If the propeller shaft 18 has a circular tube shape or a polygonal tube shape and is provided with an anti-rotation key, the propeller shaft 18 does not rotate about the rotation center of the rotation shaft 17 when the rotation shaft 17 rotates. Therefore, when the rotation shaft 17 is rotated, the meshing between the male screw groove 17*a* and the female screw groove 18*a* converts the torque of the rotation shaft 17 to a force that moves the propeller shaft 18 in the axial direction of the rotation shaft 17. When the drive of the motor 10 is stopped, the propeller shaft 18 stops at the same position due to the friction force generated by the meshing between the male screw groove 17*a* and the female screw groove 18*a*. If the drive of the motor 10 is stopped when a target brake force is reached, the propeller shaft 18 can be held at that position.

The piston 19 is arranged to surround an outer periphery of the propeller shaft 18, and is formed by a bottomed cylindrical member or a bottomed polygonal cylindrical member. An outer peripheral surface of the piston 19 abuts against an inner wall surface of the hollow section 14*a* formed in the body 14. In order to inhibit leakage of the brake fluid from between the outer peripheral surface of the piston 19 and an inner wall surface of the body 14, a seal member 22 is provided on the inner wall surface of the body 14. Thus, the W/C pressure can be applied to an end face of the piston 19. Further, if the propeller shaft 18 is provided with an anti-rotation key in order to ensure that it does not rotate about the rotation center of the rotation shaft 17 when the rotation shaft 17 rotates, the piston 19 is provided with a key groove along which the anti-rotation key slidably moves. If the propeller shaft 18 has a polygonal tube shape, the piston 19 is formed in a polygonal cylinder shape that matches that shape.

The brake pad 11 is provided at an end of the piston 19, and the brake pad 11 is moved in the left-right direction in FIG. 2 along with the movement of the piston 19. More specifically, the piston 19 can move in the left direction in the figure along with the movement of the propeller shaft 18, and also can move in the left direction in the figure independently of the propeller shaft 18 when the W/C pressure is applied to an end of the piston 19 (an end that is on the opposite side to the end provided with the brake pad 11). When the propeller shaft 18 is in an initial position (in a state before the motor 10 is rotated) and the brake hydraulic pressure in the hollow section 14*a* is not applied (W/C pressure=0), the piston 19 is moved in the right direction in the figure by a return spring (not shown in the figures) or a negative pressure in the hollow section 14*a*. The brake pad 11 is thereby moved away from the brake disc 12. If the W/C pressure becomes zero when the motor 10 is rotated and the propeller shaft 18 is moved from the initial position to the left in the figure, the movement of the piston 19 in the right direction in the figure is restricted by the moved propeller shaft 18, and the brake pads 11 are held at that position.

In the brake mechanism structured as described above, when the service brake 1 is operated, the W/C pressure generated by the operation of the service brake 1 causes the piston 19 to move in the left direction in the figure. As a result, the brake pads 11 are pressed against the brake disc 12, thereby generating a brake force. Further, when the EPB 2 is operated, the motor 10 is driven and the small gear 15 is rotated. Along with this, the large gear 16 and the rotation shaft 17 are rotated, and the meshing between the male screw groove 17*a* and the female screw 18*a* causes the propeller shaft 18 to move to the brake disc 12 side (in the left direction in the figure). Along with the movement of the propeller shaft 18, the piston 19 is moved in the same direction, and the brake pads 11 are pressed against the brake disc 12, thereby generating a brake force. Thus, the dual-operation brake mechanism is achieved that generates a brake force in response to both the operation of the service brake 1 and the operation of the EPB 2.

If the EPB 2 is operated in a state where the W/C pressure is generated by the operation of the service brake 1, the load applied to the propeller shaft 18 is reduced because the piston 19 has already been moved in the left direction in the figure by the W/C pressure. As a result, until the propeller shaft 18 comes into contact with the piston 19, the motor 10 is driven with almost no load. When the propeller shaft 18 comes into contact with the piston 19, a pressing force that presses the piston 19 in the left direction in the figure is applied, and the brake force of the EPB 2 is generated.

The EPB-ECU 9 is a well-known microcomputer that is provided with a CPU, a ROM, a RAM, an I/O and the like. The EPB-ECU 9 performs parking brake control by controlling the rotation of the motor 10 in accordance with a program stored in the ROM or the like. The EPB-ECU 9 corresponds to the parking brake control unit of the present invention. The EPB-ECU 9 receives, for example, a signal in accordance with an operation state of an operation switch (SW) 23 provided on an instrument panel (not shown in the figures) in a vehicle compartment, and detection signals from a longitudinal acceleration sensor (a longitudinal G sensor) 24 that detects acceleration in the longitudinal direction of the vehicle and an M/C pressure sensor 25. Thus, the EPB-ECU 9 drives the motor 10 in accordance with the operation state of the operation SW 23, the acceleration in the longitudinal direction of the vehicle, and the W/C pressure.

Further, the EPB-ECU 9 outputs a signal indicating whether the EPB 2 is locked or released to a lock/release display lamp 26 provided on the instrument panel, in accordance with the drive state of the motor 10.

More specifically, the EPB-ECU 9 has various functional portions for executing the lock/release control. The lock/release control includes: motor current detection that detects, on the upstream side or downstream side of the motor 10, a current (a motor current) flowing though the motor 10; current increase amount calculation that calculates a target motor current increase amount that is used when the lock control is terminated; determination as to whether or not the current increase amount, from the motor current (the current with no load) flowing when the motor 10 is driven without load, has reached the target motor current increase amount; and control of the motor 10 based on the operation state of the operation SW 23. The EPB-ECU 9 performs the lock/release control of the EPB 2, by rotating the motor 10 positive rotation or negative rotation or by stopping the rotation of the motor 10 based on the operation state of the operation SW 23 and the motor current.

Figure 3:
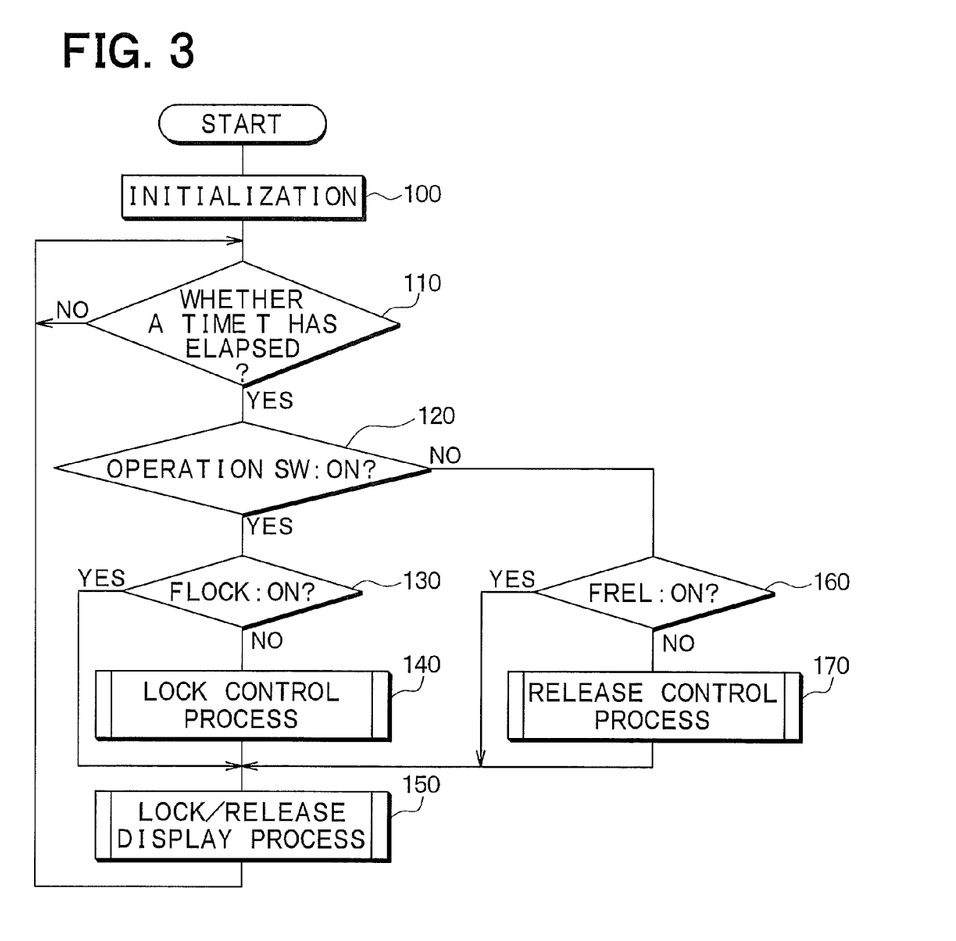
FIG. 3 is a flow chart showing details of a parking brake control process.

Next, the parking brake control will be described. The EPB-ECU 9 performs the parking brake control, using the brake system with the above described structured, according to the above-described functional portions and a program stored in the built-in ROM (not shown in the figures). FIG. 3 is a flow chart showing details of a parking brake control process.

First, a general initialization process including timer counter reset, flag reset and the like is performed at step 100. After that, the process proceeds to step 110, and it is determined whether or not a time t has elapsed. The time t used herein specifies a control cycle. More specifically, the determination at this step is repeatedly performed until the time t has elapsed from when the initialization process is completed or from when an affirmative determination is made at this step in the previous control cycle. Thus, it is ensured that the parking brake control is performed every time the time t has elapsed.

At the next step 120, it is determined whether or not the operation SW 23 is ON. If the operation SW 23 is ON, it indicates that the driver intends to actuate and lock the EPB 2. Meanwhile, if the operation SW 23 is OFF, it means that the driver intends to release the EPB 2. Therefore, if an affirmative determination is made at step 120, the process proceeds to step 130, and it is determined whether or not a lock status flag FLOCK is ON. Note that the lock status flag FLOCK is a flag that is switched to ON when the EPB 2 is actuated and locked. When the lock status flag FLOCK is ON, the actuation of the EPB 2 has already been completed, and a desired brake force has been generated. Therefore, the process only proceeds to a lock control process at step 140 when a negative determination is made at step 130. When an affirmative determination is made, the process proceeds to step 150 because the lock control process has already been completed.

Figure 4:
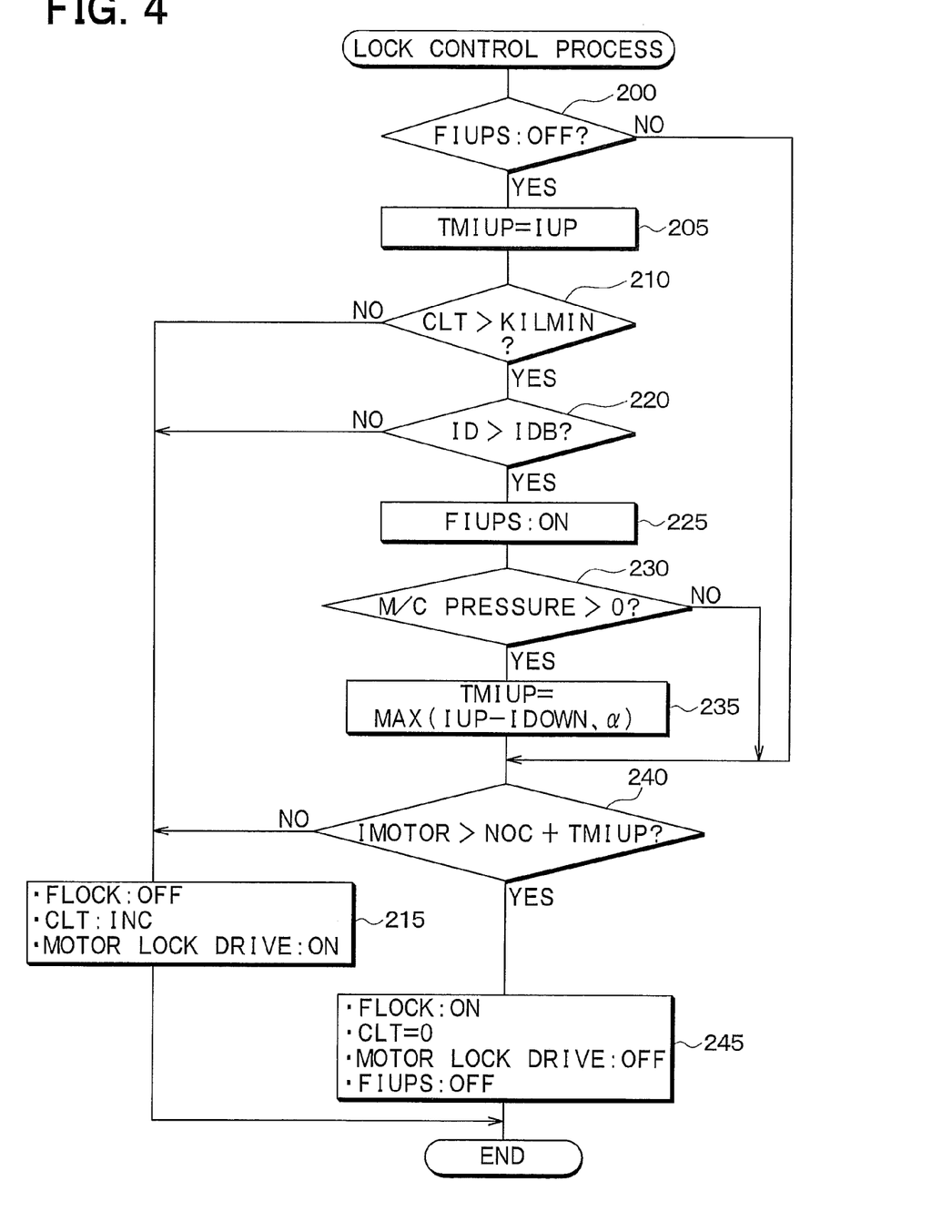
FIG. 4 is a flow chart showing details of a lock control process.

In the lock control process, the motor 10 is rotated to actuate the EPB 2. Then, the rotation of the motor 10 is stopped at a position at which a desired brake force can be generated by the EPB 2, and this state is maintained. FIG. 4 shows a flow chart showing details of the lock control process. The lock control process will be described with reference to FIG. 4.

First, at step 200, it is determined whether or not a current value increase start flag FIUPS is OFF. Note that the current value increase start flag FIUPS is a flag that is switched to ON when a motor current IMOTOR starts to increase. This flag is OFF until it is switched to ON at step 225 to be described later. If an affirmative determination is made at step 200, the process proceeds to step 205.

At step 205, a target motor current value increase amount TMIUP is set. Note that the target motor current value increase amount TMIUP is an increase amount of the motor current IMOTOR that corresponds to the target value of the W/C pressure generated by the service brake 1, in other words, an increase amount of the motor current IMOTOR from a no load current NOC. If the increase amount of the motor current IMOTOR is controlled to be equal to the target motor current value increase amount TMIUP, the generation of an excessive W/C pressure is suppressed when the parking brake is applied. The target motor current value increase amount TMIUP is set to be equal to or more than the increase amount of the motor current IMOTOR that is necessary to generate the W/C pressure corresponding to the minimum brake force that can maintain the vehicle in the parked state.

The target motor current value increase amount TMIUP is a value that is determined based on, for example, the gradient of the road on which the vehicle is parked.

The value of a first increase amount IUP corresponding to the road gradient is mapped, and the road gradient or a road gradient equivalent amount is obtained. Then, the first increase amount IUP is obtained by extracting a value corresponding to the road gradient or the road gradient equivalent amount obtained from the map. The first increase amount IUP is used as a temporary target motor current value increase amount TMIUP.

Figure 5:
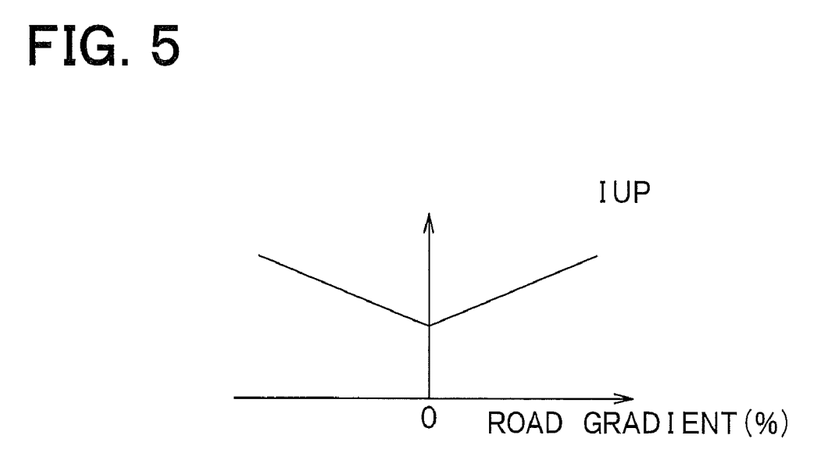
FIG. 5 is a map showing a relationship between vehicle longitudinal acceleration and a first increase amount IUP.

FIG. 5 is an example of the map. More specifically, FIG. 5 is a map showing a relationship between the first increase amount IUP and a vehicle longitudinal acceleration (herein after referred to as a vehicle longitudinal G), which is the road gradient equivalent amount. As indicated by the map shown in FIG. 5, the first increase amount IUP becomes larger in proportion to the magnitude of the vehicle longitudinal G, i.e., the magnitude of the road gradient. Therefore, in the present embodiment, the longitudinal G is calculated based on a detection signal of the longitudinal G sensor 24, and the first increase amount IUP corresponding to the calculated longitudinal G is read from the map shown in FIG. 5. Thus, the target motor current value increase amount TMIUP is obtained.

Then, the process proceeds to step 210, and it is determined whether or not a lock control time counter CLT has exceeded a minimum lock control time KTLMIN that is determined in advance. The lock control time counter CLT is a counter that measures an elapsed time from when the lock control is started, and it starts counting at the same time as the start of the lock control process. The minimum lock control time KTLMIN is an estimated minimum time to perform the lock control, and is a value that is determined in advance based on the rotation speed of the motor 10 or the like. In a similar manner to step 245 to be described later, when the motor current IMOTOR has reached the value obtained by adding the target motor current value increase amount TMIUP to the no load current NOC, it is determined that the brake force generated by the EPB 2 has reached a desired value, or has become close to the desired value. However, there is a possibility that the motor current IMOTOR will exceed the value (i.e., NOC+TMIUP), due to a rush current generated in an initial period of current supply to the motor 10. Therefore, the control initial period can be masked by comparing the lock control time counter CLT with the minimum lock control time KTLMIN. Thus, it is possible to inhibit an erroneous determination from being made based on the rush current or the like.

Therefore, if the lock control time counter CLT has not exceeded the minimum time, the lock control is continued. Accordingly, the process proceeds to step 215, and a release status flag FREL is switched to OFF. At the same time, the lock control time counter CLT is incremented. Thus, motor lock drive is turned ON, namely, the motor 10 is rotated with positive rotation. Along with the positive rotation of the motor 10, the small gear 15 is driven, and the large gear 16 and the rotation shaft 17 are rotated. The meshing between the male screw groove 17a and the female screw groove 18a causes the propeller shaft 18 to move to the brake disc 12 side. Along with this, the piston 19 is also moved in the same direction. As a result, the brake pads 11 are moved to the brake disk 12 side.

On the other hand, if an affirmative determination is made at step 210, the process proceeds to step 220, and a differential current value ID, which is obtained by differentiating the motor current IMOTOR with time, is calculated. For example, the differential current value ID is obtained by calculating the difference between the motor current IMOTOR obtained in this control cycle and the motor current IMOTOR obtained in the previous control cycle. Then, it is determined whether or not the differential current value ID is larger than a differential current threshold IDB.

The motor current IMOTOR varies in accordance with the load applied to the motor 10. For example, in the present embodiment, because the load applied to the motor 10 corresponds to the pressing force that presses the brake pads 11 against the brake disc 12, the motor current IMOTOR has a value that corresponds to the generated pressing force. Accordingly, until the propeller shaft 18 comes into contact with the piston 19, the motor 10 is driven with almost no load. As a result, the motor current IMOTOR becomes equal to the no load current NOC. When the propeller shaft 18 comes into contact with the piston 19 and a load is applied to the motor 10, the motor current IMOTOR starts to increase.

Therefore, by obtaining the differential current value ID, which is obtained by differentiating the motor current IMOTOR with time, it is possible to detect changes in the motor current IMOTOR. Further, by comparing the differential current value ID with the differential current threshold IDB, it is possible to detect when the motor current IMOTR starts to increase. Note that the differential current threshold IDB is set to a value that will identify when the motor current IMOTOR starts to increase while excluding variations in the motor current IMOTOR caused by unrelated factors.

When an affirmative determination is made at step 220, the current value increase start flag FIUPS indicating that the motor current IMOTOR starts to increase is switched to ON, and the process proceeds to step 230. On the other hand, when a negative determination is made at step 220, the processing at step 215 is performed again because the propeller shaft 18 has not yet come into contact with the piston 19.

At the subsequent step 230, after the M/C pressure has been detected based on the detection signal of the M/C pressure sensor 25, it is determined whether or not the detected M/C pressure is larger than zero, namely, it is determined whether or not the M/C pressure is generated. If the M/C pressure is generated, it is assumed that the service brake 1 has generated the W/C pressure in accordance with the depression of the brake pedal 3 by the driver, and the brake force has been generated by the service brake 1. If the brake force has been generated by the service brake 1 and the generated brake force is not taken into consideration, there is a possibility that a brake force generated by the electric parking brake 2 will become larger than necessary. To address this, whether or not the service brake 1 is actuated is determined based on whether or not the M/C pressure is generated. When an affirmative determination is made at step 230, the process proceeds to step 235, and processing is performed taking the brake force generated by the service brake 1 into consideration. On the other hand, when a negative determination is made at step 230, the processing at step 235 is not performed, and the process proceeds to step 240.

At step 235, a correction of the target motor current value increase amount TMIUP is performed as the processing that takes the brake force generated by the service brake 1 into consideration. More specifically, if the brake force is generated by the service brake 1, a correction to reduce the target motor current value increase amount TMIUP is performed. In the present embodiment, a subtraction value IDOWN of the target motor current value increase amount TMIUP is obtained. The subtraction value IDOWN is used to reduce the target motor current value increase amount TMIUP in accordance with the magnitude of the brake force generated by the service brake 1. Then, the subtraction value IDOWN is subtracted from the first increase amount IUP obtained at step 205.

In the present embodiment, the subtraction value IDOWN is obtained such that values of the subtraction value IDOWN corresponding to the M/C pressure are mapped, and the value corresponding to the M/C pressure detected at step 230 is extracted based on the map.

Figure 6:
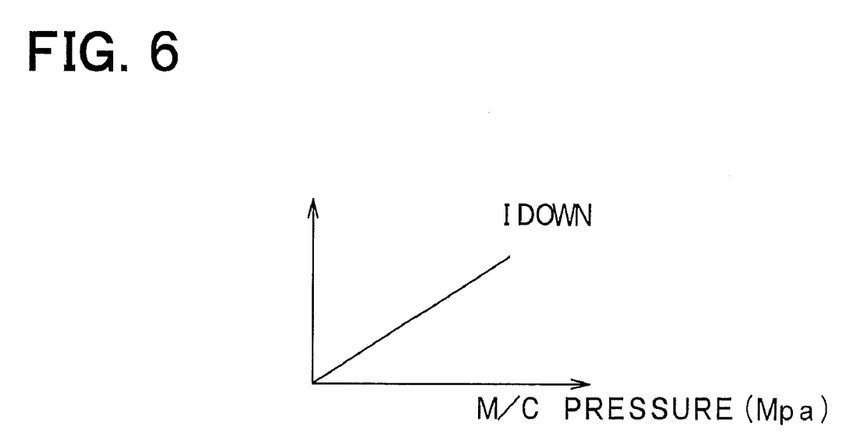
FIG. 6 is a map showing a relationship between a master cylinder pressure and a subtraction value IDOWN.

FIG. 6 is an example of the map. More specifically, FIG. 6 is a map showing a relationship between the M/C pressure and the subtraction value IDOWN. As indicated by the map shown in FIG. 6, the subtraction value IDOWN becomes larger in proportion to the magnitude of the M/C pressure, namely, the magnitude of the depression (pedal depression force) of the brake pedal 3 by the driver. Therefore, in the present embodiment, the subtraction value IDOWN corresponding to the M/C pressure detected at step 230 is read from the map shown in FIG. 6, and the subtraction value IDOWN is subtracted from the first increase amount IUP. Thus, the target motor current value increase amount TMIUP is obtained.

Note that it is not desirable that the target motor current value increase amount TMIUP becomes equal to or less than zero. Therefore, at step 235, the larger value of the value obtained by subtracting the subtraction value IDOWN from the first increase amount IUP and a predetermined value a being a positive constant (=MAX(IUP−IDOWN, α)) is used as the target motor current value increase amount TMIUP.

After that, the process proceeds to step 240, and it is determined whether or not the motor current IMOTOR has exceeded the value obtained by adding the target motor current value increase amount TMIUP to the no load current NOC. If the motor current IMOTOR has exceeded the value obtained by adding the target motor current value increase amount TMIUP to the no load current NOC, a desired brake force has been generated by the generated pressing force. More specifically, friction surfaces of the brake pads 11 are pressed against an inner wall surface of the brake disc 12 with a certain degree of force by the EPB 2. Therefore, until an affirmative determination is made at step 240, the processing at step 215 is repeatedly performed. When the affirmative determination is made, the process proceeds to step 245.

Then, at step 245, the lock status flag FLOCK indicating that locking is completed is switched to ON. At the same time, the lock control time counter CLT is set to zero, and the motor lock drive is turned off (stopped). Thus, the rotation of the motor 10 is stopped, and the rotation of the rotation shaft 17 is stopped. The friction force generated by the meshing between the male screw groove 17a and the female screw groove 18a causes the propeller shaft 18 to be held at the same position. Therefore, the brake force generated at that time is maintained. As a result, movement of the parked vehicle is restricted. In addition, the current value increase start flag FIUPS is switched to OFF. This completes the lock control process.

When a negative determination is made at step 120 shown in FIG. 3, the process proceeds to step 160, and it is determined whether or not the release status flag FREL is ON. Note that the release status flag FREL is a flag that is released when the EPB 2 is actuated. In other words, the release status flag FREL is a flag that is switched to ON when the brake force generated by the EPB 2 is released. When the release status flag FREL is ON, the actuation of the EPB 2 has already been completed, and the brake force has been released. Therefore, the process only proceeds to a release control process at step 170 when a negative determination is made at step 160.

When an affirmative determination is made, the process proceeds to step 150 because the release control process has already been completed.

Figure 7:
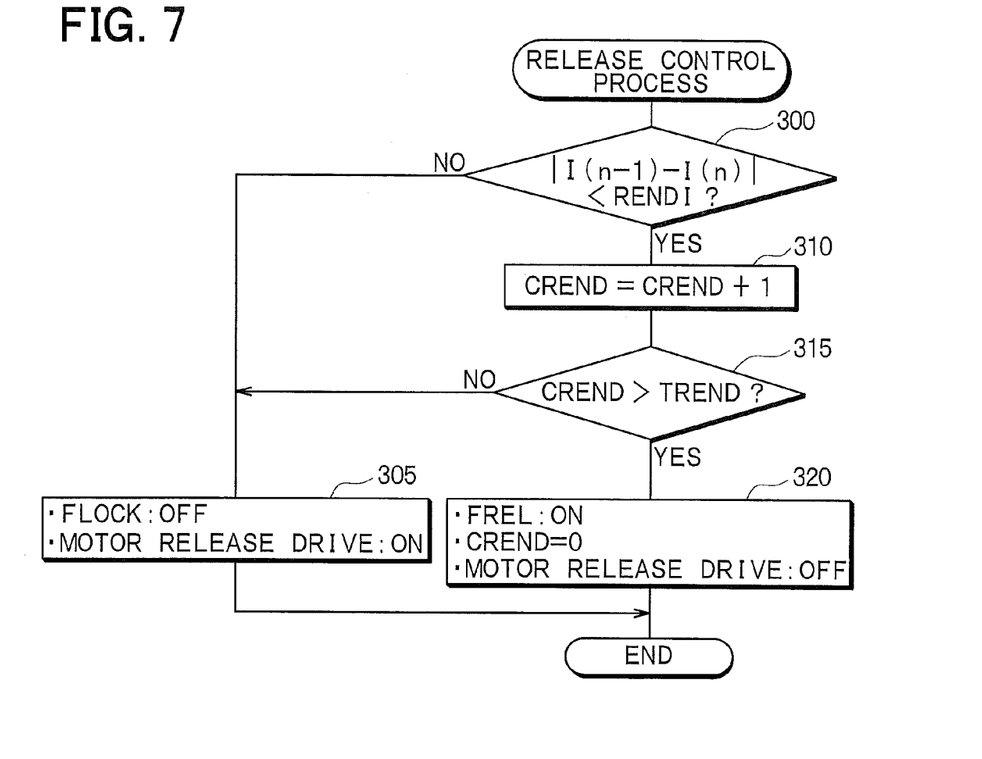
FIG. 7 is a flow chart showing details of a release control process.

In the release control process, the EPB 2 is actuated by rotating the motor 10, and the generated brake force is released by the EPB-ECU 9. FIG. 7 is a flow chart showing details of the release control process. The release control process will be described with reference to FIG. 7.

First, at step 300, it is determined whether or not the absolute value |I(n−1)−I(n)| of the difference between a current value I(n−1) of the motor current IMOTOR detected in the previous control cycle and a current value I (n) of the motor current IMOTOR detected in this control cycle is smaller than a release control end determination current value RENDI. As described earlier, the motor current IMOTOR varies in accordance with the load applied to the motor 10. If the pressing force that presses the brake pads 11 against the brake disc 12 is removed, the motor current IMOTOR is held constant at the no load current NOC, and the variation in the motor current IMOTOR vanishes. Therefore, the release control end determination current value RENDI is set to the value of the current change amount at which it is estimated that the load applied to the motor 10 vanishes. When the absolute value |I(n−1)−I(n)| becomes smaller than the release control end determination current value RENDI, it is determined that the brake pads 11 are separated from the brake disc 12 and the load applied to the motor 10 is removed.

Therefore, when a negative determination is made at step 300, the process proceeds to step 305 and the lock status flag FLOCK is switched to OFF. At the same time, motor release drive is turned on, namely, the motor 10 is rotated with negative rotation. As a result, the rotation shaft 17 is rotated along with the negative rotation of the motor 10, and the friction force generated by the meshing between the male screw groove 17a and the female screw groove 18a causes the propeller shaft 18 to move in a direction away from the brake disc 12. The piston 19 and the brake pad 11 are also moved in the same direction.

On the other hand, when an affirmative determination is made at step 300, the process proceeds to step 310 and a release control end counter CREND is incremented. After that, the process proceeds to step 315, and it is determined whether or not the release control end counter CREND has exceeded a release control end time TREND.

The release control end time TREND is a release control continuation time from the timing at which the load applied to the motor 10 is removed, namely, the timing at which the brake pad 11 is separated away from the brake disc 12. The release control end time TREND becomes longer, in accordance with an increase in the amount of movement of the propeller shaft 18, the piston 19 and the brake pad 11 that are moved by the motor 10 when the lock control is performed.

If the release control end counter CREND has not exceeded the release control end time TREND, the release control is continued. Therefore, the processing at step 305 is performed. If the release control end counter CREND has exceeded the release control end time TREND, the process proceeds to step 320 and the release status flag FREL indicating that the release control is completed is switched to ON. At the same time, the release control end counter CREND is set to zero, and the motor release drive is turned off. As a result, the rotation of the motor 10 is stopped, and due to the friction force generated by the meshing between the male screw groove 17a and the female screw groove 18a, the brake pads 11 remain separated from the brake disc 12. This completes the release control process.

Figure 8:
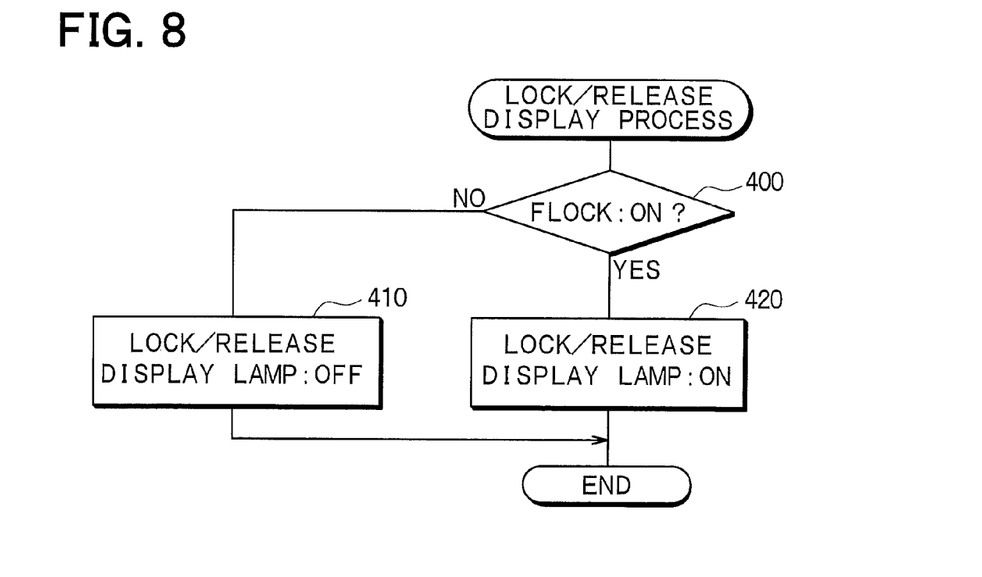
FIG. 8 is a flow chart showing details of a lock/release display process.

After the lock control process and the release control process have been completed as described above, a lock/release display process at step 150 shown in FIG. 3 is performed. FIG. 8 is a flow chart showing details of the lock/release display process. The lock/release display process will be described with reference to FIG. 8.

At step 400, it is determined whether or not the lock status flag FLOCK is ON. When a negative determination is made at step 400, the process proceeds to step 410 and a lock/release display lamp 26 is turned off. When an affirmative determination is made, the process proceeds to step 420 and the rock/release display lamp 26 is turned on. In this manner, when the EPB 2 is locked, the rock/release display lamp 26 is turned on. When the EPB 2 is released or when the release control is started, the lock/release display lamp 26 is turned off. Thus, the driver can recognize whether or not the EPB 2 is locked. This completes the lock/release display process, and also completes the parking brake control process.

Figure 9:
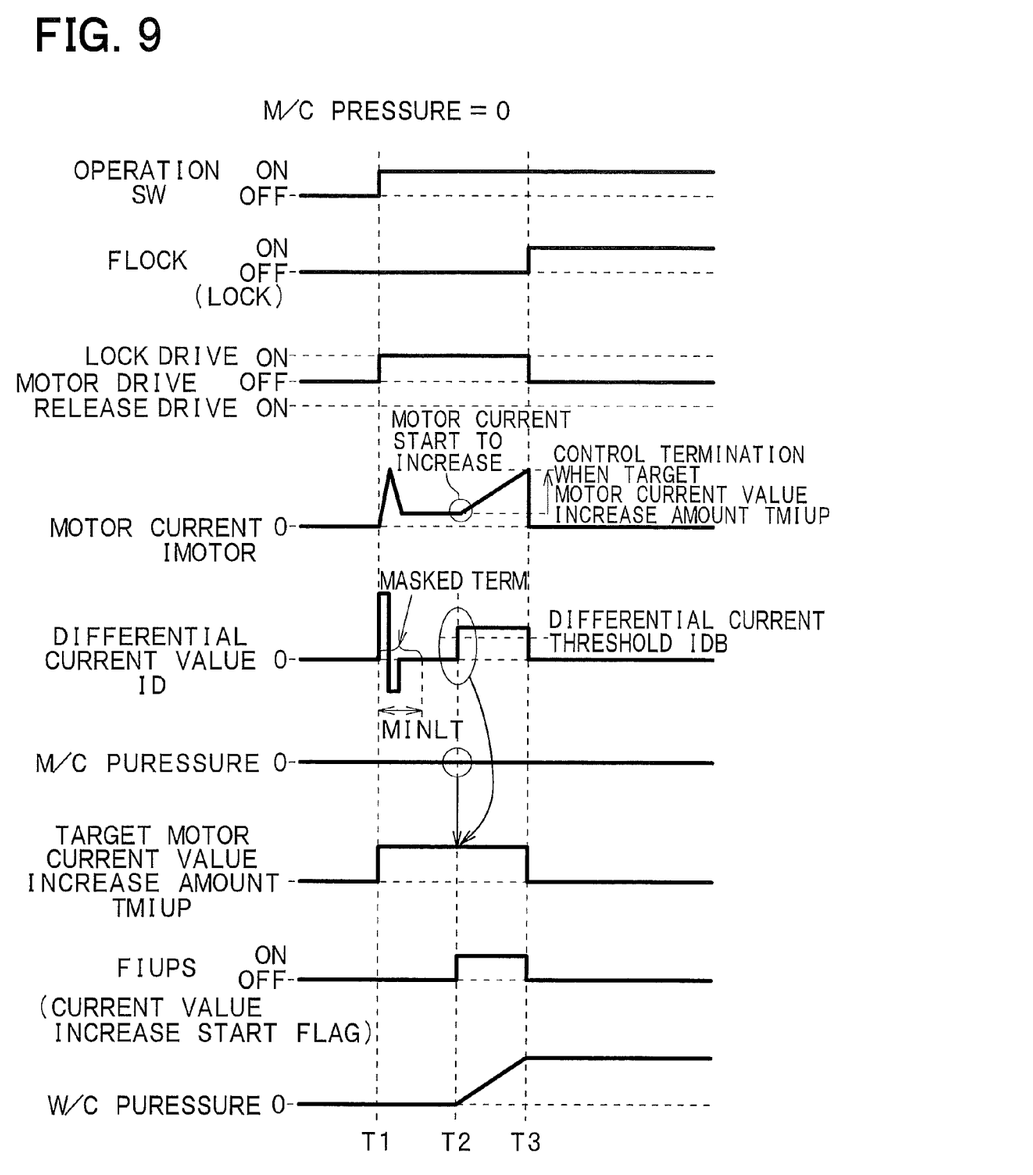
FIG. 9 is a timing chart at which the lock control process is performed when the M/C pressure is zero.
Figure 10:
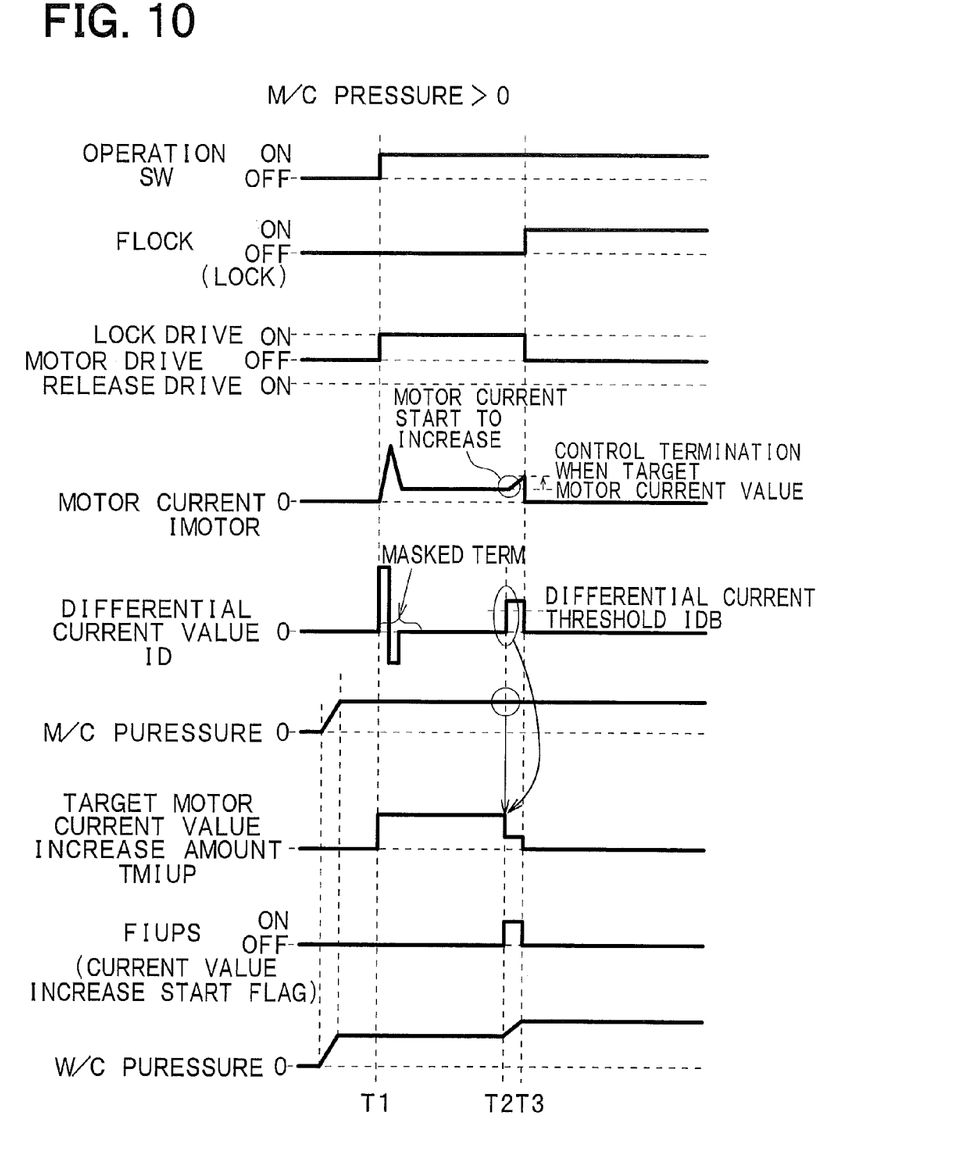
FIG. 10 is a timing chart at which the lock control process is performed when the M/C pressure is generated.

FIG. 9 and FIG. 10 are timing charts for when the above-described parking brake control process is performed. More specifically, FIG. 9 is a timing chart at which the lock control is performed when the M/C pressure is zero, namely, when the brake pedal 3 is not depressed. FIG. 10 is a timing chart at which the lock control is performed when the M/C pressure is generated, namely, when the brake pedal 3 is being depressed.

As shown in FIG. 9, when the operation SW 23 is switched from OFF to ON at a time T1 when the M/C pressure is zero, the first increase amount IUP is obtained based on the map shown in FIG. 5, and is set as the target motor current value increase amount TMIUP. At the same time, the motor lock drive is turned on. As a result, the propeller shaft 18 is moved to the brake pad 11 side. Until the propeller shaft 18 comes into contact with the piston 19 after a rush current has been generated, no load is applied to the motor 10, and the value of the motor current IMOTOR is held constant.

Thereafter, when the propeller shaft 18 comes into contact with the piston 19 at a time T2, the load to be applied to the motor 10 is generated. Therefore, the value of the motor current IMOTOR increases, and along with this, the W/C pressure also increases. At this time, the differential current value ID exceeds the differential current threshold IDB, and the current value increase start flag FIUPS is switched to ON. However, because the M/C pressure is zero, the target motor current value increase amount TMIUP is used as it is without correction. Thereafter, at a time T3, when the motor current IMOTOR exceeds the value obtained by adding the target motor current value increase amount TMIUP to the no load current NOC, the motor lock drive is turned off and the lock status flag FLOCK is switched to ON. At the same time, the current value increase start flag FIUPS is switched to OFF.

On the other hand, as shown in FIG. 10, also when the operation SW 23 is switched OFF to ON at the time T1 when the M/C pressure is generated, the first increase amount IUP is obtained based on the map shown in FIG. 5, and is set as the target motor current value increase amount TMIUP. At the same time, the motor lock drive is turned on. Thus, the propeller shaft 18 is moved to the brake pad 11 side. Until the propeller shaft 18 comes into contact with the piston 19 after a rush current has been generated, no load is applied to the motor 10, and the value of the motor current IMOTOR is held constant. At this time, the piston 19 has already been moved to the brake pad 11 side by the W/C pressure that has already been generated by the depression of the brake pedal 3 by the driver. Therefore, the lock control is performed for a longer time as compared to when the M/C pressure is zero, and the propeller shaft 18 comes into contact with the piston 19.

Thereafter, when the propeller shaft 18 comes into contact with the piston 19 at the time T2, the load applied to the motor 10 is generated. Therefore, the motor current IMOTOR increases, and along with this, the W/C pressure also increases. At this time, the differential current value ID exceeds the differential current threshold IDB, and the current value increase start flag FIUPS is switched to ON. Because the M/C pressure is generated, the subtraction value IDOWN corresponding to the M/C pressure is obtained from the map shown in FIG. 6. Then, the value obtained by subtracting the subtraction value IDOWN from the first increase amount IUP is set as the corrected target motor current value increase amount TMIUP. Thereafter, at the time T3, when the motor current IMOTOR exceeds the value obtained by adding the corrected target motor current value increase amount TMIUP to the no load current NOC, the motor lock drive is turned off and the lock status flag FLOCK is switched to ON. At the same time, the current value increase start flag FIUPS is switched to OFF.

As described above, in the present embodiment, when a brake force is generated by the service brake 1 in accordance with the depression of the brake pedal 3 by the driver, a brake force generated by the EPB 2 is reduced when the lock control is performed, taking the brake force generated by the service brake 1 into consideration. Thus, when brake force is generated by the EPB 2 and the service brake 1 compensates for the brake force, it is possible to inhibit generation of a brake force larger than necessary.

Further, in the present embodiment, at the timing when the motor current IMOTOR starts to increase, i.e., after the brake pad 11 has come into contact with the brake disc 12, if the pressing force of the brake pad 11 against the brake disc 12 increases or decreases, the target motor current value increase amount TMIUP is not corrected again. More specifically, once the current value increase start flag FIUPS is switched to ON at step 225, thereafter the processing at step 235 is not performed. Therefore, it is possible to inhibit the lock control from becoming unstable due to unnecessary changes in the target motor current value increase amount TMIUP.

Other Embodiments (1) In the embodiment described above, the motor current IMOTOR is used as a physical quantity corresponding to the pressing force of the brake pads 11, which serve as a friction member, against the brake disk 12, which serves as a friction receiving member. However, for example, the load applied to the propeller shaft 18 or the piston 19 may be detected by a load sensor and used as another physical quantity corresponding to the pressing force.

(2) In the embodiment described above, a case is described in which the target motor current value increase amount TMIUP is corrected based on the M/C pressure. However, another physical quantity that corresponds to the brake force generated by the service brake 1 may be detected, and the target motor current value increase amount TMIUP may be corrected based on it.

For example, the W/C pressure may be detected, or a pedal operation amount, such as the depression force on the brake pedal 3 or the stroke amount of the brake pedal 3, may be detected. Then, the target motor current value increase amount TMIUP may be corrected based on the detected W/C pressure or the detected pedal operation amount. Further, for example, the load applied to the propeller shaft 18 or the piston 19 may be detected by a load sensor, as the pressing force generated when the brake pad 11 serving as a friction member is pressed against the brake disc 12 serving as a friction receiving member. Alternatively, for example, the stroke amount of the propeller shaft 18 or the piston 19 may be detected as the movement amount of the brake pad 11. Then, the target motor current value increase amount TMIUP may be corrected based on the detected load or the detected stroke amount.

(3) In the embodiment described above, the subtraction value IDOWN used to correct the target motor current value increase amount TMIUP is made larger, as the physical quantity (specifically, the M/C pressure) corresponding to the brake force generated by the service brake 1 becomes larger. However, the target motor current value increase amount TMIUP may be corrected by multiplying the target motor current value increase amount TMIUP by a coefficient less than 1. In this case, the coefficient may be a fixed value. When the brake force is generated by the service brake 1, the coefficient may be varied such that the larger the physical quantity corresponding to the brake force is, the smaller the coefficient is.

(4) Further, in the embodiment described above, the EPB 2 using a disc brake is described as an example. However, the present invention is also applicable to the EPB 2 using a drum. The EPB 2 using the drum adjusts the pressure of a wheel cylinder by the drive of a motor, and presses a friction surface of a brake shoe serving as a friction member against an inner wall surface of a brake drum serving as a friction receiving member, thereby generating a brake force.

Moreover, any brake device may be used as long as it can generate a pressing force corresponding to the pressing force for moving a friction member by the motor, like a brake device (for example, a brake device using a built-in caliper) that generates a brake force by pulling a brake cable by driving the motor. For example, a brake system may be used that directly presses a hydraulic piston by driving the motor 10 and increases the hydraulic pressure, to thereby generate a brake force More specifically, any brake device may be used as long as the friction member that is moved by the service brake 1 is the same as the friction member that is moved by the EPB 2. For example, a brake device may be used in which, when the brake force is generated by moving the friction member by the EPB 2, the service brake 1 has an effect because the friction member is moved by the service brake 1.

(5) Note that the steps shown in each figure correspond to units that perform the various processes. More specifically, in the EPB-ECU 9, a portion that executes the processing at step 140 corresponds to a lock control unit, and a portion that executes the processing at step 235 corresponds to a correction unit.

While the above description is of the preferred embodiments of the present invention, it should be appreciated that the invention may be modified, altered, or varied without deviating from the scope and fair meaning of the following claims.

What is claimed is:

1. A parking brake control unit that performs parking brake control using a brake system that includes: an electric parking brake that generates a pressing force for pressing a friction member against a friction receiving member attached to a wheel by driving an electric motor, and generates a brake force by friction between the friction member and the friction receiving member; and a service brake that is actuated by operation of a brake pedal, and generates a brake force by moving the friction member toward the friction receiving member, the parking brake control unit comprising:
a lock control unit that performs lock control in which, after the pressing force is generated by driving the electric motor and the brake force of the electric parking brake is generated by the pressing force, the lock control unit stops the drive of the electric motor on condition that the pressing force reaches a target pressing force at which the drive of the electric motor is stopped, and locks the electric parking brake while maintaining the brake force, wherein the lock control unit includes a correction unit that corrects the target pressing force such that as the brake force generated by the service brake becomes larger, the target pressing force becomes smaller, wherein the lock control unit detects, as a physical quantity corresponding to the pressing force, a motor current that flows through the electric motor, sets as a no load current the motor current generated before the friction member comes into contact with the friction receiving member, sets as the target pressing force a value obtained by adding a target motor current value increase amount to the no load current, and stops the drive of the electric motor when an increase amount of the motor current from the no load current exceeds the target motor current value increase amount, and wherein the correction unit corrects the target pressing force by correcting the target motor current value increase amount such that as the brake force generated by the service brake becomes larger, the target motor current value increase amount becomes smaller.

2. The parking brake control unit according to claim 1, wherein the lock control unit measures, as a physical quantity corresponding to the brake force generated by the service brake, at least one of a master cylinder pressure, a wheel cylinder pressure, a load applied to a member that moves the friction member, and an amount of movement of the member that moves the friction member.

3. The parking brake control unit according to claim 1, wherein the correction unit obtains a subtraction value that becomes larger as the brake force generated by the service brake becomes larger, and calculates the corrected target motor current value increase amount by subtracting the subtraction value from the target motor current value increase amount.

4. The parking brake control unit according to claim 1, wherein a piston is provided in a brake caliper, and the service brake and the electric parking brake have a mechanism that presses the friction member using the piston provided in the brake caliper.

5. A parking brake control unit that performs parking brake control using a brake system that includes: an electric parking brake that generates a pressing force for pressing a friction member against a friction receiving member attached to a wheel by driving an electric motor, and generates a brake force by friction between the friction member and the friction receiving member; and a service brake that is actuated by operation of a brake pedal, and generates a brake force by moving the friction member toward the friction receiving member, the parking brake control unit comprising:
a lock control unit that performs lock control in which, after the pressing force is generated by driving the electric motor and the brake force of the electric parking brake is generated by the pressing force, the lock control unit stops the drive of the electric motor on condition that the pressing force reaches a target pressing force at which the drive of the electric motor is stopped, and locks the electric parking brake while maintaining the brake force, wherein the lock control unit includes a correction unit that corrects the target pressing force such that as the brake force generated by the service brake becomes larger, the target pressing force becomes smaller, wherein when the pressing force varies after the pressing force has been generated by the electric parking brake when the friction member coming into contact with the friction receiving member, the correction unit does not change the corrected target pressing force, wherein the lock control unit detects, as a physical quantity corresponding to the pressing force, a motor current that flows through the electric motor, sets as a no load current the motor current generated before the friction member comes into contact with the friction receiving member, sets as the target pressing force a value obtained by adding a target motor current value increase amount to the no load current, and stops the drive of the electric motor when an increase amount of the motor current from the no load current exceeds the target motor current value increase amount, and wherein the correction unit corrects the target pressing force by correcting the target motor current value increase amount such that as the brake force generated by the service brake becomes larger, the target motor current value increase amount becomes smaller.

6. The parking brake control unit according to claim 5, wherein the correction unit obtains a subtraction value that becomes larger as the brake force generated by the service brake becomes larger, and calculates the corrected target motor current value increase amount by subtracting the subtraction value from the target motor current value increase amount.

7. The parking brake control unit according to claim 5, wherein a piston is provided in a brake caliper, and the service brake and the electric parking brake have a mechanism that presses the friction member using the piston provided in the brake caliper.

8. The parking brake control unit according to claim 5, wherein the lock control unit measures, as a physical quantity corresponding to the brake force generated by the service brake, at least one of a master cylinder pressure, a wheel cylinder pressure, a load applied to a member that moves the friction member, and an amount of movement of the member that moves the friction member.

* * * * *